United States Patent
Lin et al.

(10) Patent No.: US 9,092,400 B1
(45) Date of Patent: Jul. 28, 2015

(54) AUTOMATED CONVERSION OF CONTACT NAMES AND LOCATIONS IN INCOMING MESSAGES INTO ACTION LINKS

(75) Inventors: Zhijian (Jeff) Lin, Dublin, CA (US); Eliezer Pasetes, San Ramon, CA (US)

(73) Assignee: Cellco Partnership d/b/a Verizon Wireless, Basking Ridge, NJ (US)

( * ) Notice: Subject to any disclaimer, the term of this patent is extended or adjusted under 35 U.S.C. 154(b) by 887 days.

(21) Appl. No.: 13/231,574

(22) Filed: Sep. 13, 2011

(51) Int. Cl.
*G06F 17/21* (2006.01)

(52) U.S. Cl.
CPC .................................. *G06F 17/218* (2013.01)

(58) Field of Classification Search
USPC ............................................. 455/466; 704/9
See application file for complete search history.

(56) References Cited

U.S. PATENT DOCUMENTS

| | | | |
|---|---|---|---|
| 5,946,647 A | 8/1999 | Miller et al. | |
| 7,835,504 B1 * | 11/2010 | Donald et al. | 379/88.11 |
| 8,548,444 B2 * | 10/2013 | Channakeshava et al. | 455/414.1 |
| 2004/0122951 A1 * | 6/2004 | Beck et al. | 709/227 |
| 2009/0221323 A1 * | 9/2009 | Yach | 455/552.1 |
| 2010/0167715 A1 * | 7/2010 | Domene et al. | 455/418 |
| 2011/0055234 A1 * | 3/2011 | Miettinen | 707/755 |

OTHER PUBLICATIONS

Elmer-Dewitt, Philip. 2011. Apple vs. Google: Inside an Android Patent Violation. Apple 2.0. Published online at CNNMoney/Fortune Tech, Jul. 16, 2011, 3 pages. (Obtained Oct. 14, 2011 at http://tech.fortune.cnn.com/2011/07/16/apple-vs-google-inside-an-android-patent-violation/).

* cited by examiner

*Primary Examiner* — Abul Azad

(57) ABSTRACT

The text of an incoming message may be scanned for language that matches in whole or in part the name of a stored contact and/or information indicative of a stored location. Each identified instance of language may be converted into a link. When actuated, the link may initiate an action relating to the information to which the identified language was matched, such as to call or send an email to a matching contact or to show a map of or navigating instructions to the location indicated by matching location language. When the identified language matches multiple contacts or is indicative of multiple locations, actuation of the link may result in the display of a menu of all of the matches so that the desired one can be selected. A list of possible actions may also be provided.

22 Claims, 7 Drawing Sheets

AUTOMATED CONVERSION OF CONTACT NAMES AND LOCATIONS IN INCOMING MESSAGES INTO ACTION LINKS

BACKGROUND

1. Technical Field

This disclosure relates to electronic messages and to language within the text of these messages that is indicative of contact names and locations.

2. Description of Related Art

The text of electronic messages, such as emails, SMS messages, and MMS messages, sometimes contains language that is indicative of a contact name and/or a location. Sometimes, the recipient of one of these messages may wish to take an action in connection with this contact name and/or location. For example, the recipient may wish to phone the contact, send an email to the contact, see a map showing the location, and/or receive navigation instructions to the location.

In each instance, the recipient may need to open a separate application that is dedicated to the desired action, to locate the desired contact and/or location within that separate application, and to direct the separate application to take the desired action. For example, a recipient wanting to phone a contact identified in the text of a message may need to open a calling application, look up the contact, and direct the application to call the contact. Similarly, a recipient wanting to receive instructions on how to navigate to a location indicated in the text of a message may need to open a navigation application, specify the location, and direct the application to provide navigation instruction. To obtain these results, the recipient may need to perform several steps which, in turn, may require a significant amount of time. In some cases, the burden of having to perform all of these steps may be too great, causing the recipient not to even begin the process.

SUMMARY

The text of each incoming message may be scanned for language that matches in whole or in part the name of a stored contact and/or information indicative of a stored location. Each identified instance of language may be converted into a link. When actuated, the link may initiate an action relating to the information to which the identified language was matched, such as to call or send an email to a matching contact or to show a map of or navigating instructions to the location indicated by matching location language. When the identified language matches multiple contacts or is indicative of multiple locations, actuation of the link may result in the display of a menu of all of the matches so that the desired one can be selected. A list of possible actions may also be provided, either in response to actuation of link language that has only a single match, or following a user's selection of the correct match when the linked language has multiple matches.

These, as well as other components, steps, features, objects, benefits, and advantages, will now become clear from a review of the following detailed description of illustrative embodiments, the accompanying drawings, and the claims.

BRIEF DESCRIPTION OF DRAWINGS

The drawings are of illustrative embodiments. They do not illustrate all embodiments. Other embodiments may be used in addition or instead. Details that may be apparent or unnecessary may be omitted to save space or for more effective illustration. Some embodiments may be practiced with additional components or steps and/or without all of the components or steps that are illustrated. When the same numeral appears in different drawings, it refers to the same or like components or steps.

DETAILED DESCRIPTION OF ILLUSTRATIVE EMBODIMENTS

Illustrative embodiments are now described. Other embodiments may be used in addition or instead. Details that may be apparent or unnecessary may be omitted to save space or for a more effective presentation. Some embodiments may be practiced with additional components or steps and/or without all of the components or steps that are described.

Figure 1:
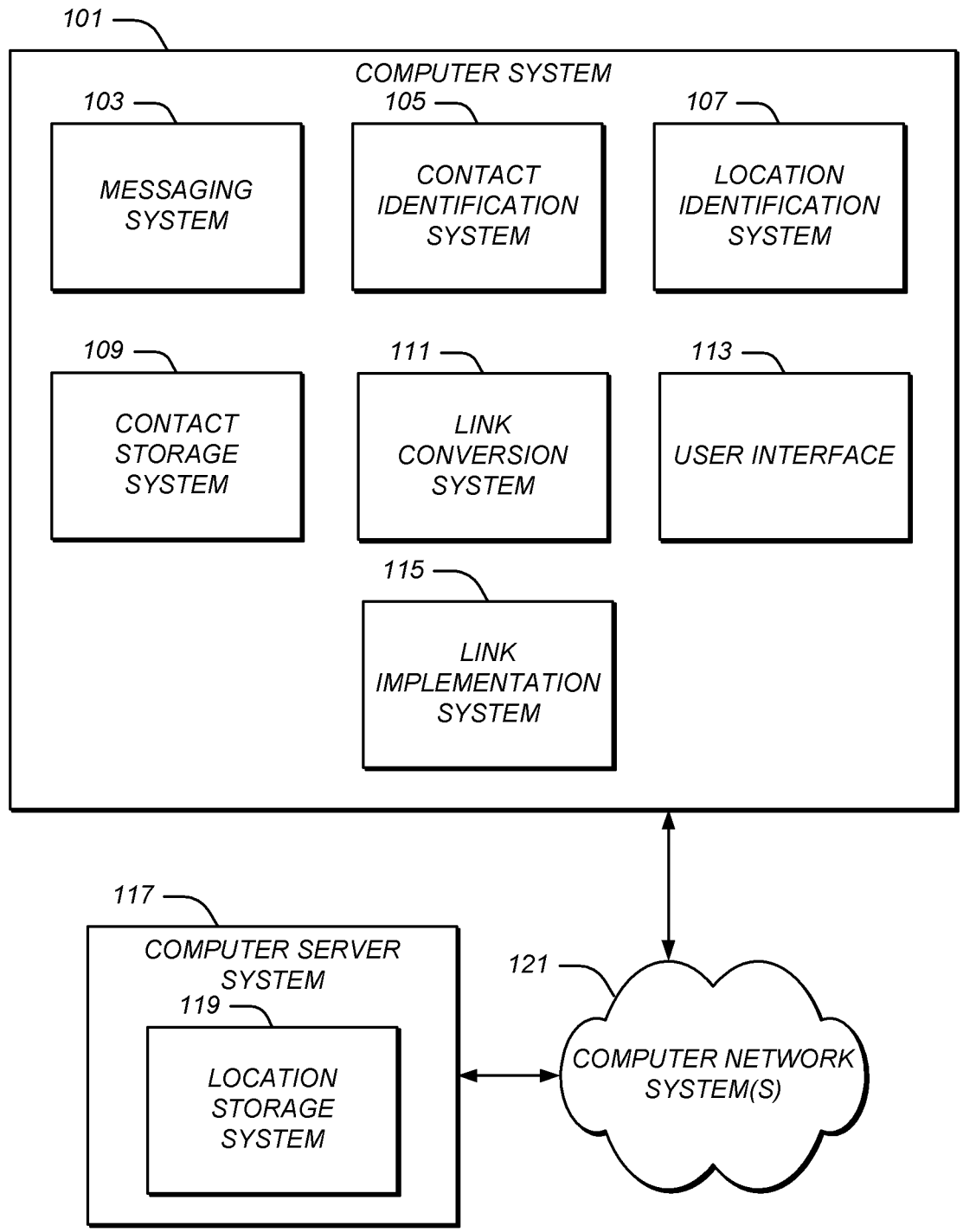
FIG. 1 illustrates an example of a system for automatically converting contact names and location-indicating language in incoming messages into action links.

FIG. 1 illustrates an example of a system for automatically converting contact names and location-indicating language in incoming messages into action links. As illustrated in FIG. 1, a computer system 101 includes a messaging system 103, a contact identification system 105, a location identification system 107, a contact storage system 109, a link conversion system 111, and a user interface 113. A related computer server system 117 includes a location storage system 119.

The computer system 101 may be of any type. For example, the computer system 101 may be a wireless mobile communication device, such as a smart phone, laptop computer, tablet computer, or netbook computer. The computer system 101 may instead be a desktop computer.

The messaging system 103 is configured to receive messages. The messages may be of any type. For example, the messages may be emails and/or instant messages, such as SMS messages and/or MMS messages.

Each message may have a portion that identifies its sender and its intended recipient. Each message may also have text.

In some cases, the text of the message may be in both a subject portion of the message and a body portion of the message. References herein to "text" are intended to be references to both the subject and body portion, as well as any other portion of the message that carries text.

The contact storage system 109 is configured to store contact information. This includes a name for each contact which may be one, two, or more words. Each name may or may not include one or more initials. The contact storage system 109 also includes information about each contact, such as its home and/or business address; home, business, and/or mobile phone number; and/or personal and/or business email address. Although illustrated as part of the computer system 101, the contact storage system 109 may be located elsewhere, such as in the computer server system 117 or in a different computer server system. In such a case, the computer system 101 may be configured to communicate with the contact storage system 109 in order to obtain information within it. This may be done over a computer network, such as the internet and/or a cellular communication network system.

The computer server system 117 is configured to communicate with multiple computer systems, including the computer system 101, and, upon request, to provide information contained within the location storage system 119. To facilitate this, the computer system 101 and the computer server system 117 may both be connected to one or more network communication systems 121, such as to the internet and/or to a cellular communication network. When the computer system 101 and the computer server system 117 are connected to different types of network communication systems, a gateway between the two network communication systems may be provided.

The location storage system 119 contains information about a plurality of locations. For each location, the information may include its street address and/or its geographic coordinates. For some or all of the locations, the information may also include a name that is associated with the location, such as the name of a building, business, association, company, or park. For some or all of the locations, the information may also include the name of events that have been scheduled to take place at the location, such as the name of a performance, sporting event, or public gathering. The precise information that is needed within the location storage system 119 may depend upon the type of language in the text of an incoming that is to be automatically recognized, as well as the type of actions that may desired to be performed in connection with this language, all as will become apparent from the discussion below. The information in the location storage system 119 may be compiled from various public and/or private databases and/or may be the result of independent investigation. Although illustrated as separate from the computer system 101, the location storage system 119 may instead be part of the computer system 101.

The contact identification system 105 is configured to identify all language in the text of each incoming message that matches a contact name in the contact storage system 109. The contact identification system 105 may employ any approach for identifying these matches. Examples of such approaches are described below. Although illustrated as within the computer system 101, the contact identification system 105 may be located elsewhere, such as in the computer server system 117 or elsewhere.

The contact identification system 105 may implement any standard for deciding when there is a match. For example, the contact identification system 105 may require exact matches or only partial matches. For example, the contact identification system 105 may deem there to be a match if only one word in the text of a message matches one of several words that are indicative of the name of a contact in the contact storage system 109. In determining whether a single word matches, the contact identification system 105 may be configured to require an exact match or may utilize fuzzy logic that takes into consideration name variations that are commonly used (e.g., matching "Tony" to "Anthony" or vice-versa, "Jim" to "James" or vice-versa, "Betty" to "Elizabeth" or vice-versa). Words that are indicative of the name of a contact in the contact storage system 109 may include words or portions of words that are unique to names in the English (or another) language.

The location identification system 107 is similarly configured to identify all language in the text of each message that matches information in the location storage system 119 that is indicative of a location. This language, for example, may be the street address of a location, the coordinates of a location, a name associated with the location (e.g., a name of a building, park, business, or school), or the name of an event that is scheduled to take place at a location (e.g., a performance, sporting event, or public gathering).

The location identification system 107 may employ any approach for determining these matches. Examples of such approaches are described below. As with the contact identification system 105, moreover, the location identification system 107 may be configured to identify matches even when the language in the text of an email message only partially matches corresponding language in the location storage system 119. The location identification system 107 may also require exact matches between words or may utilize fuzzy logic.

Although illustrated as within the computer system 101, the location identification system 107 may instead be elsewhere, such as within the computer server system 117.

The link conversion system 111 is configured to convert each instance of matching language in an incoming email message that is identified by the contact identification system 105 into a link that, when actuated, initiates an action relating to associated matched contact name. Similarly, the link conversion system 111 is configured to convert each instance of matching language in an incoming email message that is identified by the location identification system 107 into a link that, when activated, initiates an action relating to the location of its associated matched language. The identified instance of language may be converted in any way. For example, HTML coding may be used to embed the link in the identified instance of language, thereby causing the converted language to take on an attribute that signals the presence of the link, such as underlining, italics, and/or a color that is different from the color of other language.

Each link may be configured to initiate any type of action when actuated. In connection with contacts, for example, the link may be configured to initiate a phone call to the contact using a phone number stored in the contact storage system 109, form an email addressed to the contact using an address stored in the contact storage system 109, form an instant message addressed to the contact using an address stored in the contact storage system 109, form a message addressed to a section in a social network relating to the contact using an address stored in the contact storage system 109, initiate a video chat with the contact using an address stored in the contact storage system 109, illustrate the location of the contact on a map using an address stored in the contact storage system 109, or provide navigation instructions to a location for the contact, again using an address stored in the contact storage system 109.

In connection with a location that is associated with matched language, for example, the link may be configured to display a map of the location using the address specified in the text of the message or, if not present or complete, stored in the location storage system 119 in association with the matched language; to provide navigation instructions to the location using this same address; to call a number that is associated with the matched language that is stored in the location storage system 119 in association with the matched language; or to frame a message addressed to an address that is associated with the location that is stored in the location storage system 119 in association with the matched language.

In some cases, an instance of language that is identified by the contact identification system 105 may not uniquely define only a single contact in the contact storage system 109. Similarly, an instance of language that is identified by the location identification system 107 may not be indicative of only a single location that is stored in the location storage system 119. In this situation, the link that is provided by the link conversion system 111 may be configured, when user activated, to cause a list of links to all of these matches to be displayed. The list may be arranged in an order that is reflective of the most likely match. For example, "Betty" may return three matches: Betty, Liz, and Elizabeth. Betty may be listed first as the most likely, followed by Elizabeth and then Liz. Matches that are very unlikely may be eliminated. For example, Liz in the previous example might instead be eliminated. A user may then select one of these matches by activating one of these links, following which the associated action may be initiated, such as one of the actions described above.

Even when an identified instance of language matches only a single contact or location, the link may still cause a menu to be displayed, such as a menu that specifies a list of different actions relating to the contact or location. In this situation, the desired action may be selected through actuation, following which the selected action may be implemented.

Each action that is ultimately taken may be implemented by an application (not shown) within the computer system 101 that is appropriate for the action. For example, when the action is to call a phone number, activating the link may activate a phone calling application and pass the phone number to it for dialing. Similarly, when the action is to initiate a message, activating the link may activate a messaging application and pass the address or phone number to it for inclusion in the address portion of a message that the user would complete. When the action is to map a location, activating the link may call a mapping application and pass the location to it for mapping. When the action is to provide navigation instructions, activating the link may call a navigation application and pass the target location to it for navigation.

The user interface 113 is configured to receive the selections that are described herein from a user of the computer system 101 and to provide information that is described herein to the user, such as the messages, links, and menus. The user interface 113 may include any type of user interface device, such as a keyboard, pointing device, display, touch screen, microphone, headset, and/or loud speaker.

Figure 2:
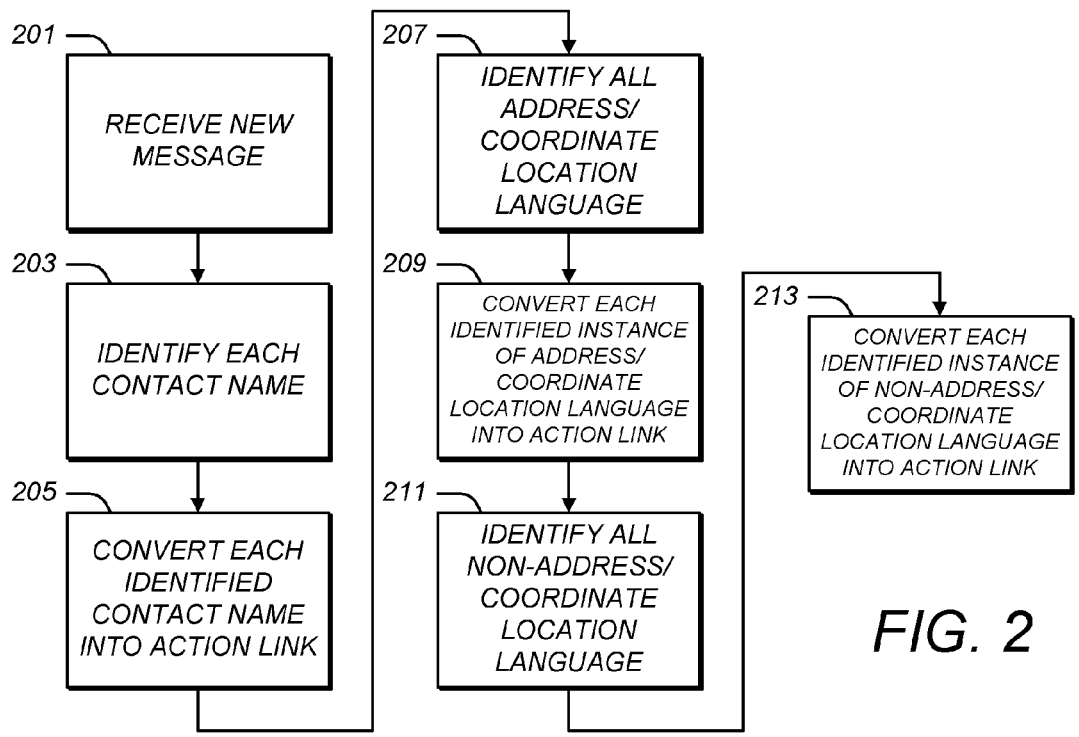
FIG. 2 illustrates an example of a process for automatically converting contact names and location-indicating language in incoming messages into action links.

FIG. 2 illustrates an example of a process for automatically converting contact names and location-indicating language in incoming messages into action links. The process illustrated in FIG. 2 may be implemented by the systems illustrated in FIG. 1 or by different systems. Similarly, the systems illustrated in FIG. 1 may perform processes different from the one illustrated in FIG. 2.

As illustrated in FIG. 2, an incoming message may be received, as illustrated by a Received New Message step 201. This may be performed by the messaging system 103.

Each contact name that appears in the text of the message may be identified, as illustrated by an Identify Each Contact Name step 203. As explained above, this step may be performed by the contact identification system 105 using any type of matching algorithm. Examples of these are discussed below.

Each identified contact name is then converted into an action link, as indicated by a Convert Each Identified Contact Name Into Action Link step 205. This step may be performed, for example, by the link conversion system 111 using any of the approaches discussed above may be followed.

All language in the text of each message that is indicative of a location may next be identified. This step may be broken down into two steps.

One step may be to identify all language in the text of each message that constitutes an address of a location or coordinates of a location, as reflected by an Identify All Address/Coordinate Location Language step 207. This step may be performed by the location identification system 107 as discussed above using any type of matching algorithm. Examples of these are discussed below. Each identified instance of an address or coordinates is then converted into an action link, as indicated by a Convert Each Identified Instance of Address/Coordinate Location Language Into Action Link step 209. This may be performed by the link conversion system 111 using any of the approaches discussed above.

Each instance of language in the text of each message that is indicative of an address, but that does not include either a street address or geographic coordinates, is then identified, as reflected by an Identify All Non-Address/Coordinate Location Language step 211. Examples of these are set forth in FIG. 6A and discussed below. This step may also be performed by the location identification system 107 as discussed above using any type of matching algorithm. Examples of these are discussed below.

Each identified instance of non-address/coordinate location language is then converted into an action link, as reflected by a Convert Each Identified Instance of Non-Address/Coordinate Location Language Into Action Link step 213. This step may also be performed by the link conversion system 111 using any of the approaches discussed above in connection with the step 209.

The various steps that have been described in connection with FIG. 2 may be performed in a different order. For example, contact names may be identified after locations and/or non-address/coordinate location language may be identified before address/coordinate location language. Similarly, the conversions of identified language into various different (e.g., contact, message, address) links may all be performed at the end, rather than in the alternating manner illustrated in FIG. 2.

Still further, some of the steps illustrated in FIG. 2 may not be performed at all. For example, some systems might not identify language indicative of contacts and/or locations. Even when a system does identify language indicative of a location, it may not identify non-address/coordinate language or address/coordinate language when present.

Figure 3:
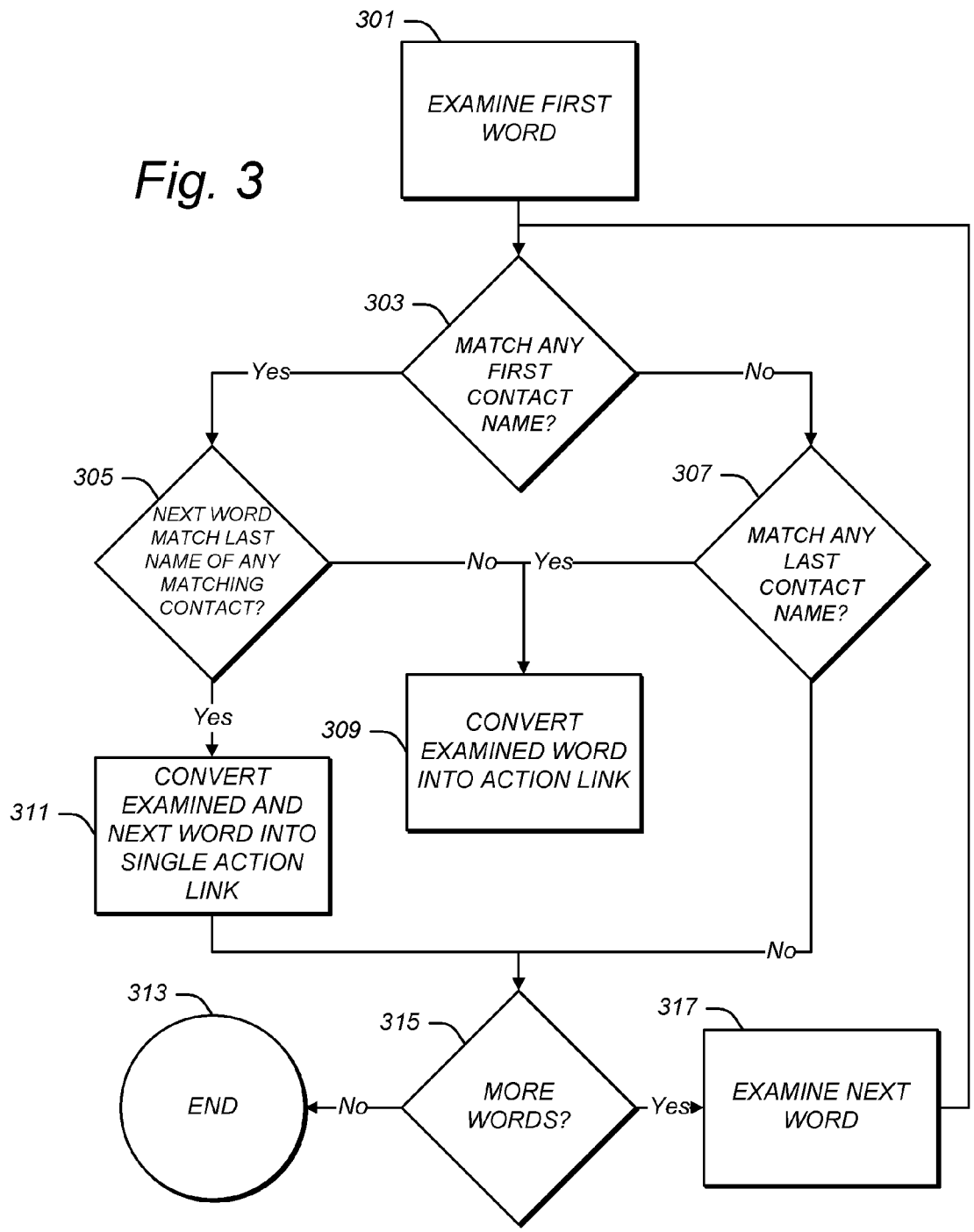
FIG. 3 illustrates an example of a process for automatically converting contact names in incoming messages into action links.

FIG. 3 illustrates an example of a process for automatically converting contact names in incoming messages into action links. The first word of text of an incoming message may be examined, as reflected by an Examine First Word step 301. This may be done by the contact identification system 105.

The contact identification system 105 may query the contact storage system 109 to determine whether this word matches the first name of any contact in the contact storage system 109, as reflected by a Match Any First Contact Name? decision step 303. If so, the contact identification system 105 may be configured to examine the next word in the text of the incoming message to determine whether it matches the last name of the contact that was matched with the first word, as reflected by a Next Word Match Last Name of Any Matching Contact? decision step 305. If so, both the first word and the next word may be converted by the link conversion system 111 into a single action link, as reflected by a Convert Examined and Next Word Into Single Action Link step 311. If not, on the other hand, only the first word may be converted into an action link, as reflected by a Convert Examined Word Into Action Link step 309.

If the examined word did not match any first name in the contact storage system 109, on the other hand, the contact identification system 105 may be configured to determine whether it nevertheless matches any last name in the contact storage system 109, as reflected by a Match Any Last Name? decision step 307. If so, the examined word may be converted into an action link, as reflected by the Convert Examined Word Into Action Link step 309.

After converting the examined and, in some cases, the next word into an action link, or if the examined word fails to match any first or last name in the contact storage system 109, the contact identification system 105 may be configured to determine whether there are any additional words in the text of the message that have not yet been examined, as reflected by a More Words? decision step 315. If not, the process may end, as reflected by an End step 313. If so, the next word in the text of the message is examined, as reflected by an Examine Next Word step 317. The process then repeats at the decision step 303.

In the case where a contact contains a middle name, the contact identification system 105 may try to match all words (first name, middle name, last name) of a contact in the message, and create an action link for the match. In the case where a first name of a contact is the same as the last name of another contact (e.g. Tom Hamilton and Hamilton Smith), the system may try to match the full contact name (first name and last name) in the message. If there is no full contact name match in the message but only the shared name (e.g. I would like to invite Hamilton to the party), the system may display a list of matches (e.g. Tom Hamilton and Hamilton Smith), so that the user can select the right contact based on the context of the conversation.

The net result of the process illustrated in FIG. 3 may be to identify only a single word or multiple words separated by one or more spaces as matching contact names. Each identified instance of matching language may match one or multiple contacts in the contact storage system 109.

Figure 4:
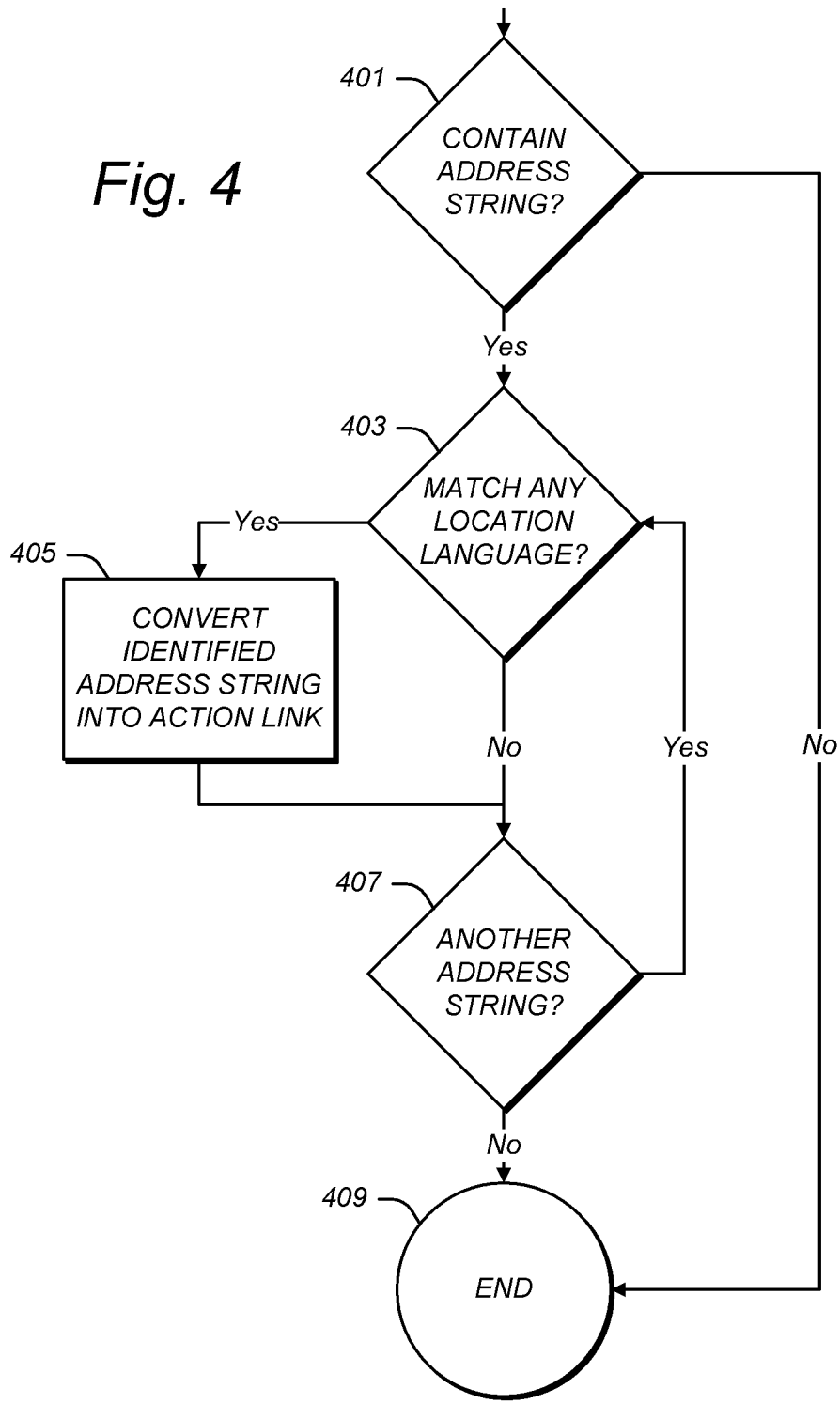
FIG. 4 illustrates an example of a process for automatically converting addresses and coordinates in incoming messages into action links.

FIG. 4 illustrates an example of a process for automatically converting addresses and coordinates in incoming messages into action links.

The process may begin by the location identification system 107 determining whether the text of the incoming message contains a string that appears to constitute a street address, as reflected by a Contain Address String? decision step 401. Any algorithm may be employed to make this determination.

For example, the algorithm may search for a single or multiple digit number. The algorithm may or may not in addition seek to determine whether the number is later followed by the recognized name of a route, such as "Ave," "Avenue," "Street," "St," "Blvd," "Boulevard," or "Lane." The algorithm may or may not also check to see if the name or an abbreviation of a state or other recognized large geographic region is included.

If what seems to be a possible street address is identified, the location identification system 107 may then query the location storage system 119 to determine whether the number and one or more of the words that follow constitutes or is part of a valid street address, as reflected by a Match any Location Language decision step 403.

The algorithm may stop the analysis once the algorithm finds a partial match, or may continue after finding a partial match to determine whether succeeding words also match. If succeeding words do not also match, the algorithm may either choose to designate the initially matched word or words as a match, or conclude that there is no match.

The location identification system 107 may also seek to determine whether the text of the message contains numbers that look like coordinates as part of the Contain Address String? Decision step 401. To do so, it may employ an algorithm that searches for at least two multi-digit, space-separated, numbers. If it finds what appears to be coordinates, it may then query the location storage system 119 to see if they match as part of the Match Any Location Language? Decision step 403.

When a particular string of identified language in the text of the message matches several entries in the location storage system 119, the algorithm may be configured to designate the identified language as a match only if the number of matches does not exceed a threshold. For example, the identified language might be the word "Broadway" and might match dozens of entries. The system might merely ignore such language if it matches more than a threshold number that might be user-settable. The algorithm may also be configured to impose a length requirement on the string before designating the identified language as a match. For example, the algorithm may be configured not to designate one or more string length boundaries (minimum and/or maximum) for identification, e.g., any string length that is less than five characters or greater than 40 characters to be a location match. Once a match is found, the identified address string is converted into an action link by the link conversion system 111 using any of the approaches discussed above, as reflected by a Convert Identified Address String Into Action Link step 405. The location identification system 107 then determines whether there are any other strings in the text of the incoming message that appear to be an address, as reflected by an Another Address String? decision step 407. If so, the process returns to determine whether the address string matches a location in the location storage system 119 as reflected by the Match Any Location Language? decision step 403. When there are no more strings that appear to be an address, the process ends, as reflected by an End step 409.

Figure 5:
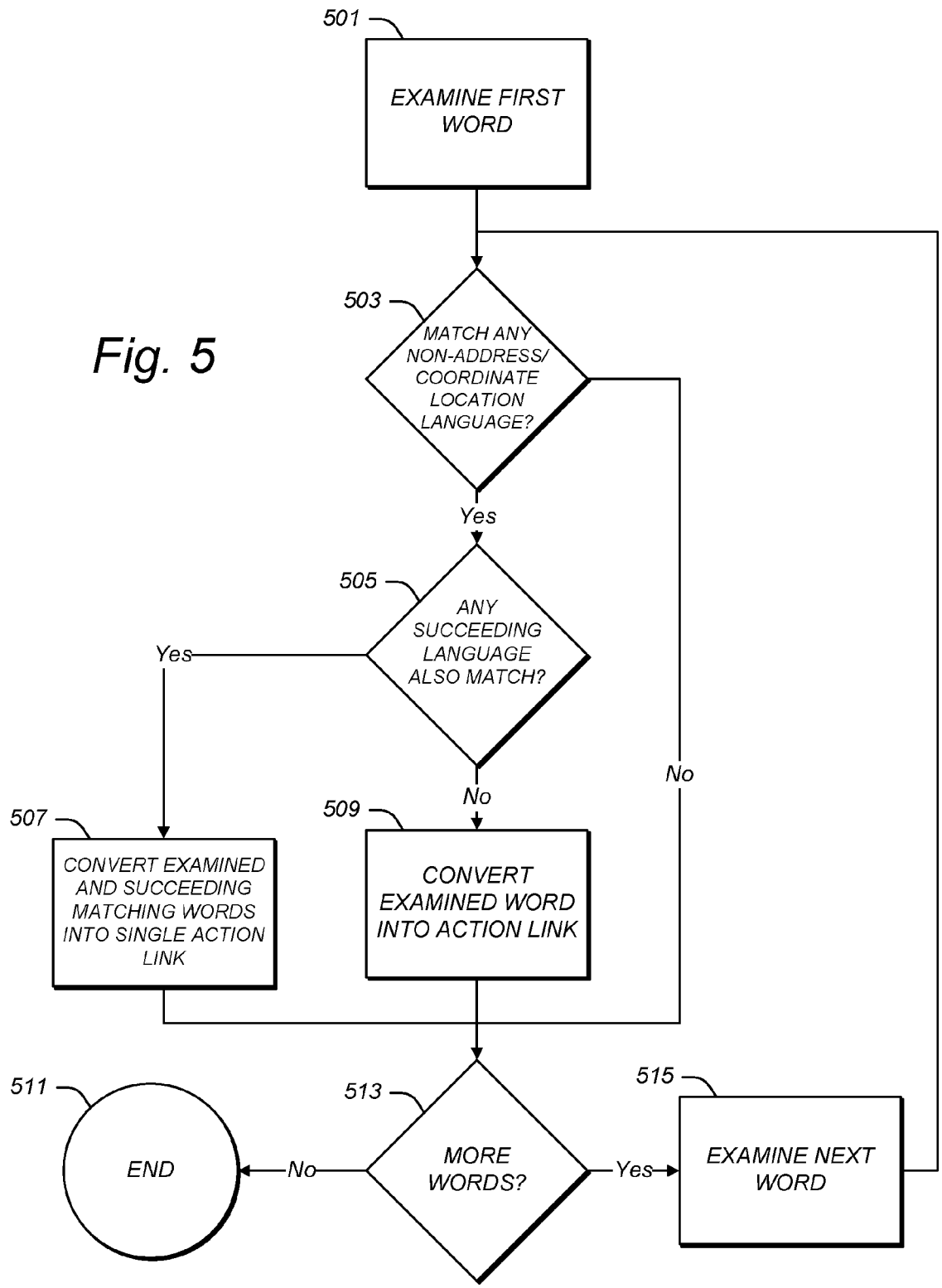
FIG. 5 illustrates an example of a process for automatically converting location-indicating language in incoming messages that does not include addresses or coordinates into action links.

FIG. 5 illustrates an example of a process for automatically converting location-indicating language in incoming messages that does not include an address or coordinates into action links. The location identification system 107 examines the first word, as reflected by an Examine First Word step 501. The location identification system 107 determines whether the word matches any non-address/coordinate location information in the location storage system 119, as reflected by a Match Any Non-Address/Coordinate Location Language? decision step 503. If so, the location identification system 107 checks to see whether any succeeding language (which might be one or more words) continues to match information in the location storage system 119 that is indicative of a location, as reflected by an Any Succeeding Language Also Match? decision step 505. If so, the link conversion system 111 converts the examined and succeeding matching words into a single action link, as reflected by a Convert Examined and Succeeding Matching Words Into Single Action Link step 507. If not, on the other hand, the link conversion system 111 converts just the examined word into an action link, as reflected by the Convert Examined Word Into Action Link 509.

The location identification system 107 then checks to see whether there are anymore unexamined words in the text of the incoming message, as reflected by a More Words? decision step 513. If so, the location identification system 107 examines the next word in the text of the incoming message, as reflected by an Examine Next Word step 515 and the process repeats. If not, on the other hand, the process ends, as reflected by an End step 511.

Figure 6A:
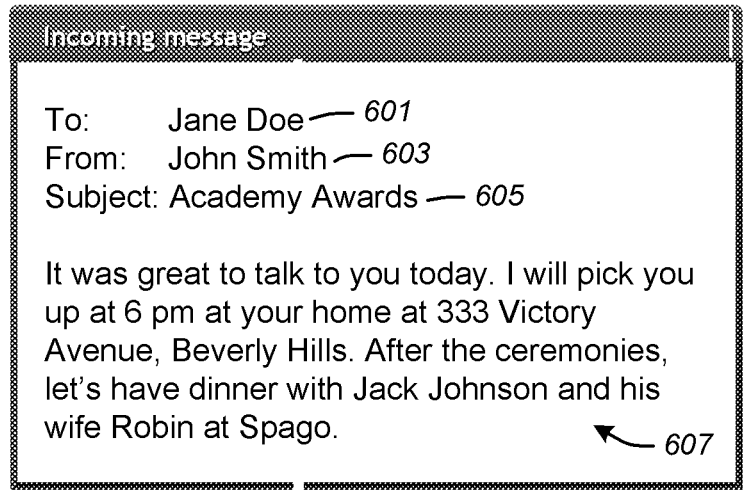
FIG. 6A illustrates an example of an incoming message.

FIG. 6A illustrates an example of an incoming message. As illustrated in FIG. 6A, the incoming message may identify a name 601 of the entity to which the message is addressed, a name 603 of the sender of the message, and text that includes a subject 605 and a body 607.

Figure 6B:
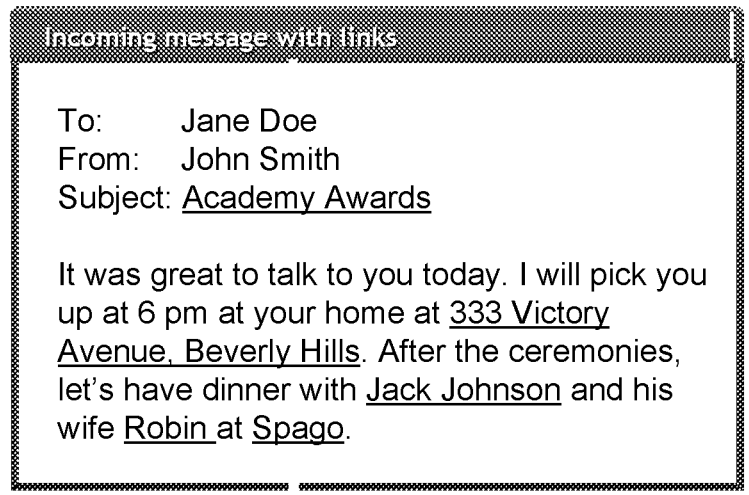
FIG. 6B illustrates an example of the incoming message illustrate in FIG. 6A after each identified instance of matching language has been converted into a link.

FIG. 6B illustrates an example of the incoming message illustrated in FIG. 6A after each identified instance of matching language has been converted into a link. As illustrated in FIG. 6B, several instances of language in the incoming message have been identified by the contact identification system 105 and the location identification system 107 as matching a contact in the contact storage system 109 and information about a location in a location storage system 119, respectively. Each instance has been converted to a link by the link conversion system 111. More specifically, the language "Academy Awards" has been identified by the location identification system 107 as identifying an event at a location that is specified in the location storage system 119, the language "333 Victory Avenue, Beverly Hills" has been identified by the Location Identification System 107 as identifying an address that is within the location storage system 119, the contact identification system 105 has identified the language "Jack Johnson" to be a contact in the contact storage system 109, the contact identification system 105 has identified the word "Robin" to be part of a contact in the contact storage system 109, and the location identification system 107 has identified the word "Spago" to be the name of a location that is contained within the location storage system 119. Although each link is illustrated with the identified instance of language being underlined, other forms of link identification may be used instead, such as italics and/or a different color font.

Figure 7:
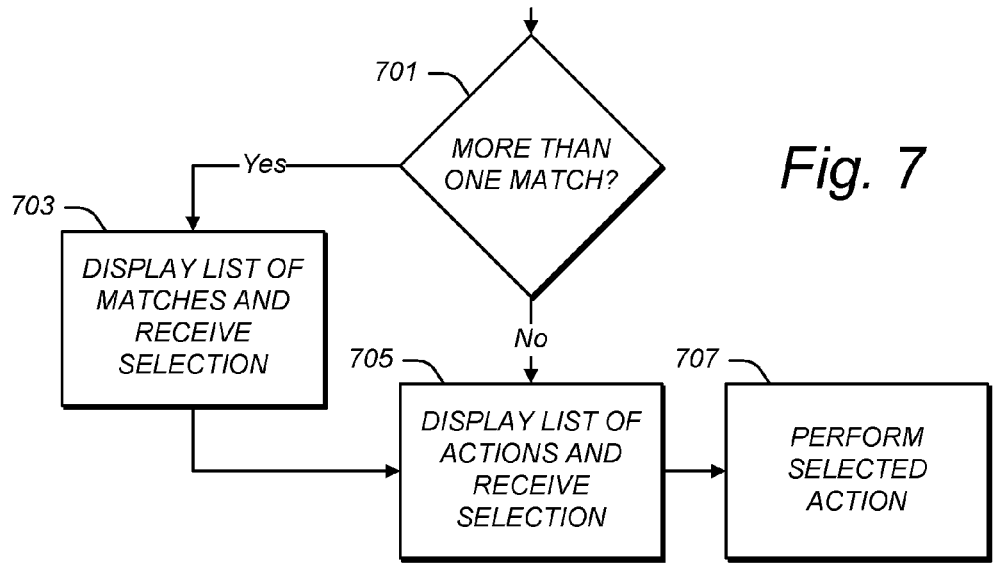
FIG. 7 illustrates an example of a process for allowing a user to select an action in response to activation of an action link in an incoming message.

FIG. 7 illustrates an example of a process for allowing a user to select an action in response to activation of an action link in an incoming message. The process illustrated in FIG. 7 may be performed by the systems identified in FIG. 1. Similarly, the systems identified in FIG. 1 may also perform processes different from the one illustrated in FIG. 7. The process illustrated in FIG. 7 may also be performed by systems other than the ones illustrated in FIG. 1.

As illustrated in FIG. 7, once a link is actuated, a determination may be made as to whether the identified instance of language that constitutes the link matches more than one contact in the contact storage system 109 or matches more than information about one location in the location storage system 119, as reflected by a More Than One Match? decision step 701. This determination may be made by the link implementation system 115. If so, a list of the matches may be displayed and a selection by the user of one of them may be received by the link implementation system 115, as reflected by a Display List of Matches and Receive Selection step 703. If there is not more than one match, or after a selection of one match has been made, a list of possible actions for the only existing or selected match may be displayed and a user's selection of one of them may be received, as reflected by a Display List of Actions and Receive Selection step 705. The selected action may then be performed, as reflected by a Perform Selection Action step 707. The link implementation system 115 may be used to facilitate this performance, using any of the approaches discussed above.

The sequence of steps illustrated in FIG. 7 is again only an example. Different sequences may be used instead. For example, the determination of whether a match is unique may be made at the time the link is created. In this situation, the link may be crafted to cause a window to open listing the matches and asking that the correct match be selected.

Also contrary to what is illustrated in FIG. 7, actuation of a link may cause a single specific action to be implemented, rather than displaying a list of actions for selection, such as any of the specific actions discussed above.

Figure 8:
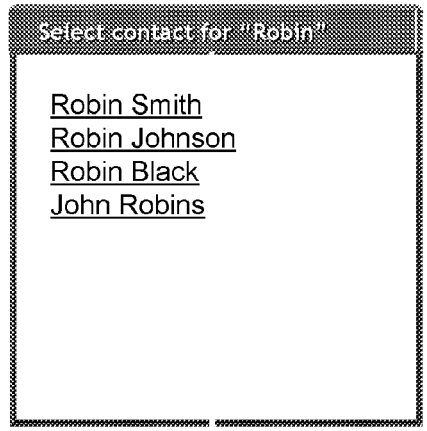
FIG. 8 illustrates an example of the results of actuating the action link for the language "Robin" in the incoming message illustrated in FIG. 6B.

FIG. 8 illustrates an example of the results of actuating the action link for the language "Robin" in the incoming message illustrated in FIG. 6B. The list illustrated in FIG. 8 is an example of a list which may display during the Display List of Actions and Receive Selection step 705 illustrated In FIG. 7. As illustrated in FIG. 8, there are four contact names in the contact storage system 109 that match the word "Robin" in the text of the incoming message. This includes a match to the name "John Robins," which indicates that the matching algorithm in this instance is using fuzzy logic. The user may select the correct one, following which an action is initiated or a list of possible actions is displayed, all as discussed above.

Figure 9:
FIG. 9 illustrates an example of the results of actuating the action link for the language "Spago" in the incoming message illustrated in FIG. 6B.

FIG. 9 illustrates an example of the results of actuating the action link for the language "Spago" in the incoming message illustrated in FIG. 6B. FIG. 9 again illustrates an example of what may happen during the Display List of Actions and Receive Selection step 705. As illustrated in FIG. 9, the word "Spago" in the text of the incoming message matches the names of four places in the location storage system 119. The user may select the correct one, following which an action is initiated or a list of possible actions is displayed, all as discussed above. The system might instead be configured to automatically select the closest location or order the presentation in order of proximity.

Figure 10:
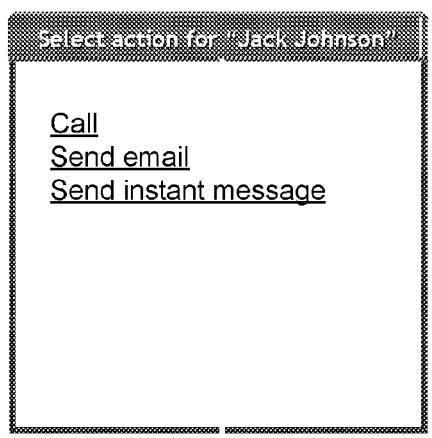
FIG. 10 illustrates an example of the results of actuating the action link for the language "Jack Johnson" in the incoming message illustrated in FIG. 6B.

FIG. 10 illustrates an example of the results of actuating the action link for the language "Jack Johnson" in the incoming message illustrated in FIG. 6B. Selection of the "Call" action may cause a call to be placed to Jack Johnson at a phone number in the contact storage system 109. Selection of the "Send email" action may cause an email to be created that is addressed to Jack Johnson at an email address that is in the contact storage system 109. Selection of the "Send instant message" action may cause an instant message to be formed addressed to the phone number of Jack Johnson as contained in the contact storage system 109. A different set of actions may be listed, which may include one or more of the other actions described above.

Figure 11:
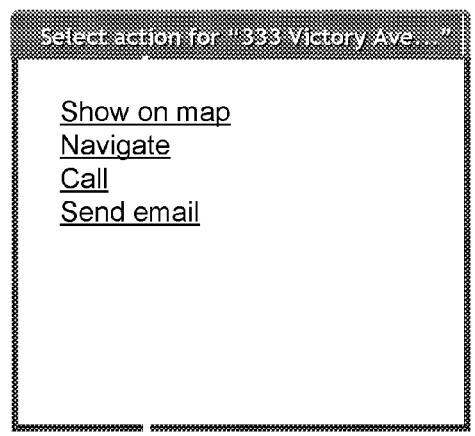
FIG. 11 illustrates an example of the results of actuating the action link the language "333 Victory Avenue, Beverly Hills" in the incoming message illustrated in FIG. 6B.

FIG. 11 illustrates an example of the results of actuating the action link the language "333 Victory Avenue, Beverly Hills" in the incoming message illustrated in FIG. 6B. Selection of the "Show on map" action may cause a map to be displayed that displays the location of the address on the map. Selection of the "Navigate" action may cause navigation instructions to be provided that navigate from the current location of the mobile device to the address. Further selection of a route dependent on a particular means of transportation (e.g., car, foot, bicycle) may also be provided after selection of navigation. Selection of the "Call" action may cause a phone call to be placed to a phone number that is contained in the location storage system 119 that is related to the address, such as a reservation number for a restaurant at the address or a show-time information line of a movie theatre at the address. Selection of the "Send email" action may cause an email to be formed addressed to an email address that the location storage system 119 identifies as being associated with this address, such as the email address of a friend that lives at the address.

Unless otherwise indicated, the computer system 101 and the computer server system 117 that have been discussed may each be implemented with a computer system configured to perform the functions that have been described herein for the component. Each computer system includes one or more processors, memory devices (e.g., random access memories (RAMs), read-only memories (ROMs), and/or programmable read only memories (PROMS)), tangible storage devices (e.g., hard disk drives, CD/DVD drives, and/or flash memories), system buses, video processing components, network communication components, input/output ports, and/or user interface devices (e.g., keyboards, pointing devices, displays, microphones, sound reproduction systems, and/or touch screens).

Each computer system may include one or more computers at the same or different locations. When at different locations, the computers may be configured to communicate with one another through a wired and/or wireless network communication system.

Each computer system may include software (e.g., one or more operating systems, device drivers, application programs, and/or communication programs). When software is included, the software includes programming instructions and may include associated data and libraries. When included, the programming instructions are configured to implement one or more algorithms that implement one more of the functions of the computer system, as recited herein. Each function that is performed by an algorithm also constitutes a description of the algorithm. The software may be stored on one or more non-transitory, tangible storage devices, such as one or more hard disk drives, CDs, DVDs, and/or flash memories. The software may be in source code and/or object code format. Associated data may be stored in any type of volatile and/or non-volatile memory.

The components, steps, features, objects, benefits and advantages that have been discussed are merely illustrative. None of them, nor the discussions relating to them, are intended to limit the scope of protection in any way. Numerous other embodiments are also contemplated. These include embodiments that have fewer, additional, and/or different components, steps, features, objects, benefits and advantages. These also include embodiments in which the components and/or steps are arranged and/or ordered differently.

For example, the location storage system 119 may be part of the computer system 101. In this case, the location storage system 119 may contain less data, and the data may not be as up to date.

Unless otherwise stated, all measurements, values, ratings, positions, magnitudes, sizes, and other specifications that are set forth in this specification, including in the claims that follow, are approximate, not exact. They are intended to have a reasonable range that is consistent with the functions to which they relate and with what is customary in the art to which they pertain.

All articles, patents, patent applications, and other publications that have been cited in this disclosure are incorporated herein by reference.

The phrase "means for" when used in a claim is intended to and should be interpreted to embrace the corresponding structures and materials that have been described and their equivalents. Similarly, the phrase "step for" when used in a claim is intended to and should be interpreted to embrace the corresponding acts that have been described and their equivalents. The absence of these phrases in a claim mean that the claim is not intended to and should not be interpreted to be limited to any of the corresponding structures, materials, or acts or to their equivalents.

The scope of protection is limited solely by the claims that now follow. That scope is intended and should be interpreted to be as broad as is consistent with the ordinary meaning of the language that is used in the claims when interpreted in light of this specification and the prosecution history that follows and to encompass all structural and functional equivalents. Notwithstanding, none of the claims are intended to embrace subject matter that fails to satisfy the requirement of Sections 101, 102, or 103 of the Patent Act, nor should they be interpreted in such a way. Any unintended embracement of such subject matter is hereby disclaimed.

Except as stated immediately above, nothing that has been stated or illustrated is intended or should be interpreted to cause a dedication of any component, step, feature, object, benefit, advantage, or equivalent to the public, regardless of whether it is or is not recited in the claims.

The terms and expressions used herein have the ordinary meaning accorded to such terms and expressions in their respective areas, except where specific meanings have been set forth. Relational terms such as first and second and the like may be used solely to distinguish one entity or action from another, without necessarily requiring or implying any actual relationship or order between them. The terms "comprises," "comprising," and any other variation thereof when used in connection with a list of elements in the specification or claims are intended to indicate that the list is not exclusive and that other elements may be included. Similarly, an element proceeded by "a" or "an" does not, without further constraints, preclude the existence of additional elements of the identical type.

The Abstract is provided to help the reader quickly ascertain the nature of the technical disclosure. It is submitted with the understanding that it will not be used to interpret or limit the scope or meaning of the claims. In addition, various features in the foregoing Detailed Description are grouped together in various embodiments to streamline the disclosure. This method of disclosure is not to be interpreted as requiring that the claimed embodiments require more features than are expressly recited in each claim. Rather, as the following claims reflect, inventive subject matter lies in less than all features of a single disclosed embodiment. Thus, the following claims are hereby incorporated into the Detailed Description, with each claim standing on its own as separately claimed subject matter.

The invention claimed is:

1. A user terminal, comprising:
   a processor;
   a messaging system configured to receive messages, each message being of a type selected from the list of: an email, an instant message, a short message service (SMS) message, and a multimedia service (MMS) message;
   a contact identification system configured to identify language in the text of a message that matches a contact name in a contact storage system; and
   a link conversion system configured to convert each respective identified instance of language into a link that, when actuated, initiates an action relating to the contact name that matched the respective identified instance of language, wherein at least one of the links is configured to cause a list of selectable actions for the matched contact name to be displayed when actuated.

2. The user terminal of claim 1 wherein the contact identification system is configured to identify words with at least one space between them as an instance of language that matches a contact name.

3. The user terminal of claim 1 wherein the contact identification system is configured to identify a word as matching a contact name if the word only matches part of the contact name.

4. The user terminal of claim 3 wherein the contact identification system is configured to identify a single word as matching a contact name if it matches part of the contact name.

5. The user terminal of claim 1 wherein the contact identification system is configured to check whether a word in the message matches a first name of a contact name in the contact storage system and, if so, whether the next word matches a last name of the contact name.

6. The user terminal of claim 1 wherein the contact identification system is configured to identify language that matches contact names using fuzzy logic.

7. The user terminal of claim 1 wherein each link is configured to cause a list of selectable matching contacts in the contact storage system to be displayed when actuated, when the language that is converted into the link matches more than one contact name in the contact storage system.

8. The user terminal of claim 1 wherein the list of selectable actions includes an action that calls the contact name, an action that generates an instant message addressed to the contact name, and an action that generates an email message addressed to the contact name.

9. The user terminal of claim 1 wherein the text of the message includes a subject and a body and the contact identification system is configured to identify matching language in both the subject and the body of the message.

10. The user terminal of claim 1 further comprising:
   a location storage system configured to store information indicative of a plurality of locations; and
   a location identification system configured to identify language in the text of the message that matches information indicative of one of the locations stored in the location storage system, even when the language in the text of the message does not include either a street address or geographic coordinates,
   wherein the link conversion system is configured to convert each identified instance of language matching information indicative of one of the locations into a link that, when actuated, initiates an action relating to the one location indicated by the matched information.

11. The user terminal of claim 10 wherein the language in the text of the message that matches information indicative of a location is a name associated with the location.

12. The user terminal of claim 10 wherein the language in the text of the message that matches information indicative of a location is an event scheduled to take place at the location.

13. The user terminal of claim 1 further comprising:
   a location identification system configured to identify language in the text of the message that matches information indicative of one of a plurality of locations stored in a location storage system contained within a computer server system separate from the user terminal and configured to provide information indicative of the plurality of locations to multiple user terminals,
   wherein the link conversion system is configured to convert each identified instance of language matching information indicative of one of the locations into a link that, when actuated, initiates an action relating to the one location indicated by the matched information.

14. A non-transitory, tangible, computer-readable medium containing a program of instructions configured to cause a user terminal running the program of instructions to:
   receive, from a network communication system, a plurality of messages, each message being of a type selected from the list of: an email, an instant message, a short message service (SMS) message, and a multimedia service (MMS) message; and
   for each respective message:
      identify language in the text of the respective message that matches a contact name in a contact storage system;
      convert each respective identified instance of language into a corresponding link that, when actuated, initiates an action relating to the contact name that matched the respective identified instance of language; and
      display the respective message, including each respective identified instance of language converted into each corresponding link, via a user interface of the user terminal,
      wherein at least one of the links is configured to cause a list of selectable actions for the matched contact name to be displayed when actuated.

15. The computer-readable medium of claim 14 wherein the text of each message includes a subject and a body, and the program of instructions is configured to identify matching language in both the subject and the body of each message.

16. The computer-readable medium of claim 14 wherein the program of instructions is configured to identify language consisting of only a single word in the text of each received message as matching a contact name when it only matches a part of the contact name.

17. A user terminal, comprising:
   a messaging system configured to receive messages, each message being of a type selected from the list of: an email, an instant message, a short message service (SMS) message, and a multimedia service (MMS) message;
   a location identification system configured to identify language in the text of each message that matches information indicative of one of a plurality of locations stored in a location storage system, even when the language in the text of the message does not include either a street address or geographic coordinates; and
   a link conversion system configured to convert each identified instance of language matching information indicative of one of the locations into a link that, when actuated, initiates an action relating to the one location indicated by the matched information.

18. The user terminal of claim 17 wherein at least one identified instance of language is the name of a place of interest.

19. The user terminal of claim 17 wherein at least one identified instance of the language is the name of an event.

20. The user terminal of claim 19 wherein the name of the event matches multiple instances of information indicative of location in the location storage system and wherein the location identification system is configured to match the event to the location that is closest to the computer system.

21. The user terminal of claim 17 wherein the location storage system is part of a computer server system separate from the user terminal configured to be accessed by multiple different user terminals.

22. A system, comprising:
a computer server system that:
- contains a location storage system configured to store information indicative of a plurality of locations; and
- is configured to provide the information to multiple different user terminals; and a user terminal that is separate from the computer server system and that includes:
- a messaging system configured to receive messages, each message being of a type selected from the list of: an email, an instant message, a short message service (SMS) message, and a multimedia service (MMS) message;
- a location identification system configured to identify language in the text of each message that matches information indicative of one of the locations stored in the location storage system; and
- a link conversion system configured to convert each identified instance of language matching information indicative of one of the locations into a link that, when actuated, initiates an action relating to the one location indicated by the matched information.

* * * * *